United States Patent [19]

Clum et al.

[11] Patent Number: 5,389,266
[45] Date of Patent: Feb. 14, 1995

[54] METHOD OF REMOVING ZEBRA MUSSELS FROM WATERWAYS AND WETTED SURFACES

[75] Inventors: David N. Clum, Higdon, Ala.; Frederick Krosner, Signal Mountain; Jewel R. Leak, Jr., Hixson, both of Tenn.

[73] Assignee: Dixstar, Inc., Chattanooga, Tenn.

[21] Appl. No.: 179,936

[22] Filed: Jan. 11, 1994

Related U.S. Application Data

[63] Continuation-in-part of Ser. No. 37,349, Mar. 25, 1993, Pat. No. 5,294,351.

[51] Int. Cl.⁶ ................................................. C02F 1/02
[52] U.S. Cl. .................................. 210/747; 210/774; 422/6; 422/38; 134/19; 405/195.1; 405/211
[58] Field of Search ............... 134/19; 405/195.1, 303, 405/211, 218; 210/747; 422/6, 38

[56] References Cited

U.S. PATENT DOCUMENTS

| | | | |
|---|---|---|---|
| 5,062,967 | 11/1991 | Muia et al. | 210/764 |
| 5,128,050 | 7/1992 | Gill | 210/764 |
| 5,294,351 | 3/1994 | Clum et al. | 210/747 |

*Primary Examiner*—Neil McCarthy
*Attorney, Agent, or Firm*—Alan Ruderman

[57] ABSTRACT

A method for killing zebra mussels from a bottom surface of a waterway and from the surfaces of watercraft, docks, pilings and similar facilities located within a waterway. The surfaces to be treated are isolated in a batch of water enclosed within a chamber. The isolated batch of water is thereafter heated to a temperature lethal to the zebra mussels and held at that temperature for a sufficient time to kill the zebra mussels. The isolated batch of water and the treated surface are thereafter released from the chamber and the isolated state.

10 Claims, 4 Drawing Sheets

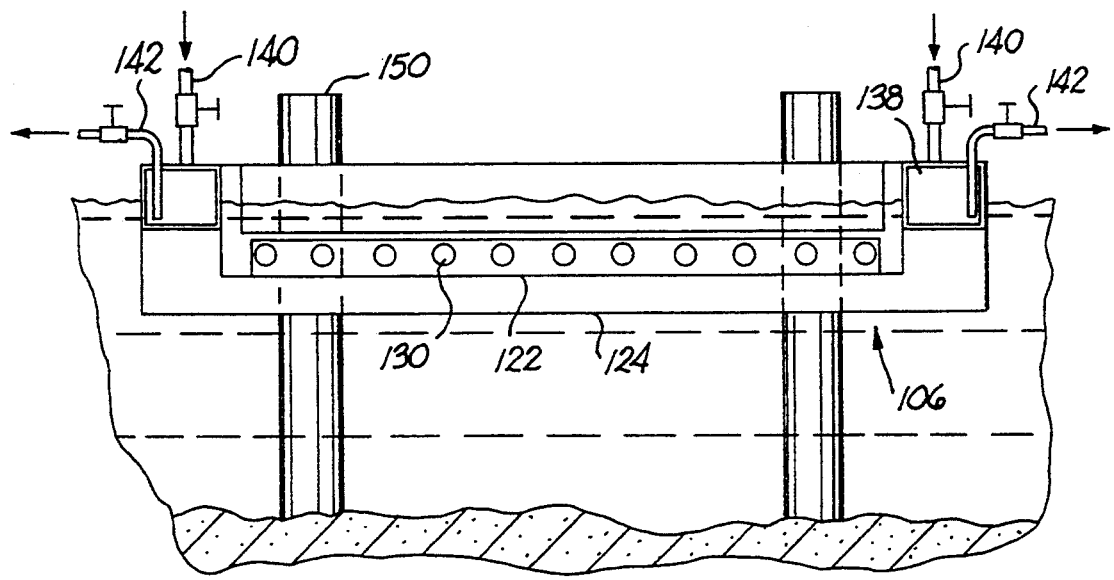
FIG. 8
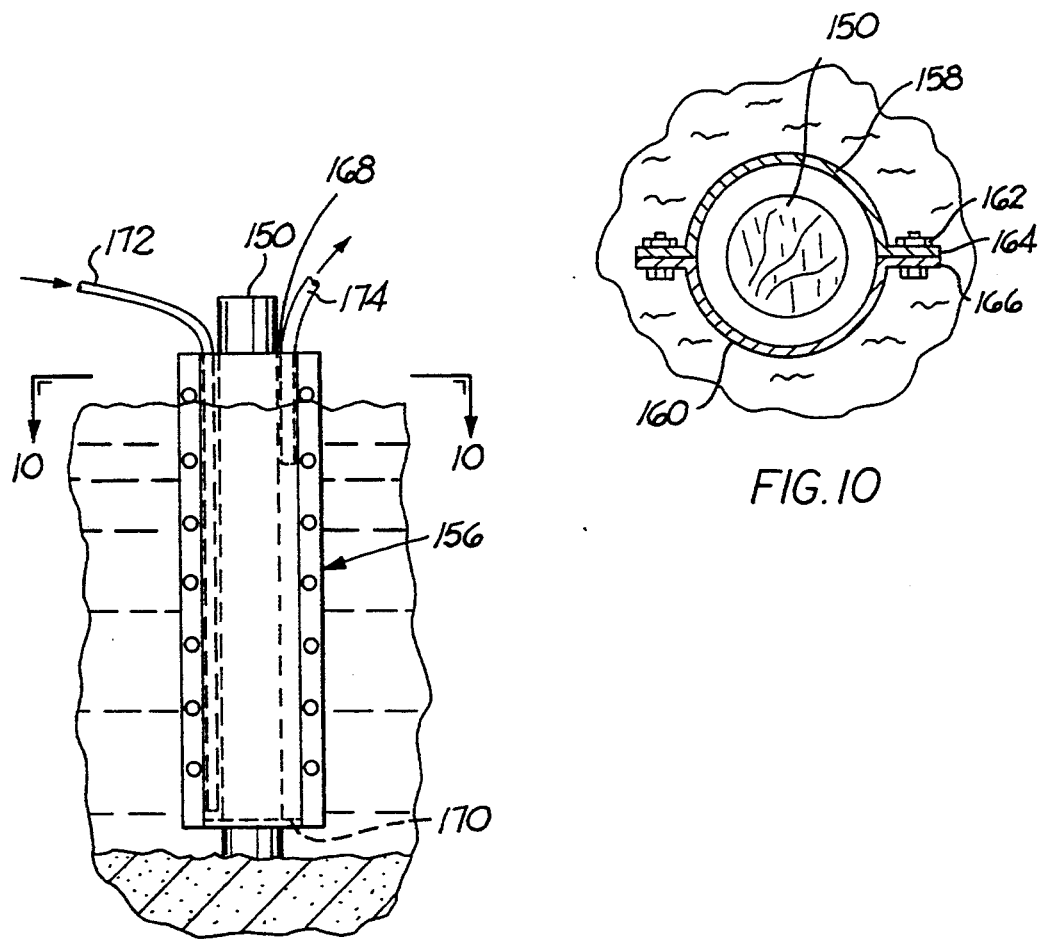
FIG. 9
FIG. 10

METHOD OF REMOVING ZEBRA MUSSELS FROM WATERWAYS AND WETTED SURFACES

REFERENCE TO RELATED APPLICATIONS

This application is a continuation-in-part of U.S. application Ser. No. 08/037,349, filed Mar. 25, 1993, now U.S. Pat. No. 5,294,351.

BACKGROUND OF THE INVENTION

This invention relates to a method of controlling or removing zebra mussels from surfaces of waterways, surfaces of facilities in waterways, such as watercraft, docks, marinas and the like, and from the ballast water of watercraft, and more particularly to a method of killing the zebra mussels in such water and on water contacting surfaces of such facilities by isolating the surfaces of the facilities in a batch of water and heating the water to a sufficient temperature for a sufficient time.

Dreissena Polymorpha, commonly known as zebra mussels, were unknown in the waters of the United States and Canada prior to 1988. They are indigenous to Europe and it is theorized that these prolific breeders entered the waters of Lake St. Clair when a foreign ship emptied its ballast water. Since then zebra mussels have found their way into the Great Lakes, namely Lake Erie and Lake Ontario and have already been reported in the Ohio and Tennessee river systems. A single female zebra mussel may lay some ten thousand to two million eggs per year which have a four to eight year life cycle comprising four stages: the fertilized egg stage lasting some two to three days, the veliger or larvae stage lasting some two to three weeks, the settling stage and the adult stage which begins at about twelve months. In the veliger stage the zebra mussels are a free swimming planktonic larval which may disperse for miles. It is in this stage that they are small enough to enter through the screens of a power plant such as an electrical utility generating plant and municipal and industrial water plants drawing their water supply from the contaminated rivers and lakes. In the settling stage they are visible to the eye and possess visceral threads, known as byssus, which cling to or attach to almost any solid stationary surface in areas having low velocity currents, e.g. less than approximately seven feet per second. In this stage they attempt to attach or connect onto such surfaces and if a clear surface is not available, they will climb on top of others that are so attached. In this manner they colonize on the condensers and other equipment on such plants, on the bottoms of watercraft, on docks and pilings, in the ballast of vessels, and on the bottoms of waterways, and may form into mats or clumps up to five inches thick. The zebra mussels have few natural predators and can stay out of water for substantial periods of time, up to 14 days, merely needing moist or humid areas in which to exist.

A solution to the problem of controlling zebra mussels in electric utility power plants and water plants was proposed in our aforesaid copending patent application by isolating the water in the inlet cell of such plants prior to its entering the distribution lines within the plant, the water being held in the inlet cell and heated to a lethal temperature which is maintained for a sufficient time to assure 100 percent mortality to the zebra mussels in any of its life cycle stages. However, problems remain with regard to zebra mussels within waterways, and on watercraft and on facilities and equipment along the waterways.

SUMMARY OF THE INVENTION

Consequently, it is a primary object of the present invention to provide a method and apparatus for removing zebra mussels from the bottom of a waterway such as a lake or river and from watercraft and facilities in a waterway.

It is another object of the present invention to provide a method and apparatus for controlling the colonization of zebra mussels in the bed of a waterway and on the surfaces of watercraft and facilities in a waterway.

It is a further object of the present invention to provide a method and apparatus for controlling zebra mussels on the bottom surfaces of waterways and on the surfaces of watercraft and facilities in a waterway, and in the ballast water of watercraft by isolating water about the surface which is to be controlled, thereafter heating the water in which the surface is isolated to a lethal temperature for a sufficient time to kill the zebra mussels in all stages of development in the isolated water and on the surface to be controlled, and thereafter liberating or releasing the isolated water.

Accordingly, the present invention provides a method and apparatus for destroying or controlling and removing zebra mussels from a bottom surface of a waterway and from the surfaces of facilities and watercraft in a waterway by isolating and heating the water on the surface to be controlled, the water being heated to a lethal temperature which is maintained for a sufficient time to assure 100 percent mortality to the zebra mussel in any of its life cycle stages, and thereafter releasing the heated water from the isolated state.

According to one aspect of the invention, a chamber having an open bottom is placed on a portion of the bottom surface of the waterway, such as a lake or river bottom, the chamber substantially isolating water which contacts the surface portion within the interior of the chamber. The water within the chamber is thereafter heated to a lethal temperature for killing the zebra mussels and this temperature is held for sufficient time to kill the zebra mussels. The chamber is removed from the bottom surface and the process may be repeated at another portion of the bottom surface.

Another aspect of the present invention is the control of zebra mussels on the surface of a watercraft or vessel by providing a water chamber into which the watercraft may enter. The chamber is thereafter closed against entry and release of water and the water within the chamber is heated to and maintained at the lethal temperature for sufficient time to kill the zebra mussels on the surface of the watercraft. The chamber may then be opened and the watercraft or vessel is released. The surface of the vessel may be scrubbed while within the chamber or after release therefrom.

In another aspect of the present invention, facilities or equipment in a waterway, such as a dock or pilings and the like may be isolated in water within a chamber which is closed about the surface to be controlled. The water is thereafter heated to and maintained for sufficient time at the lethal temperature to kill the zebra mussels. The chamber is thereafter opened and removed from about the facility or equipment.

The heating may be by means of a heat exchanger within the chamber or by feeding water within the chamber to a heat exchanger to be heated and thereafter returned to the chamber. Preferably the heat exchanger receives a heated fluid medium which is heated by a heating plant which may be located on land or on a barge.

BRIEF DESCRIPTION OF THE DRAWINGS

The particular features and advantages of the invention as well as other objects will become apparent from the following description taken in connection with the accompanying drawings in which:

FIG. 8 is a view similar to FIG. 6 but of another manner of forming apparatus for controlling the zebra mussels on a portion of a dock;

FIG. 9 is a cross sectional view of apparatus for performing the method of controlling zebra mussels on the pilings of a dock such as illustrated in FIG. 5; and FIG. 10 is a cross sectional view taken substantially along line 8—8 of FIG. 7.

DESCRIPTION OF THE PREFERRED EMBODIMENTS

In accordance with the present invention the surface to be treated is enclosed within a water containing chamber, the water within the chamber being water normally in contact with the surface, and the water within the chamber is heated to a lethal temperature of between approximately 95° F. to 100° F., held at that temperature for a period of time sufficient to kill any of the zebra mussels in the water, whether in the veliger stage or other stage, and thereafter the chamber is opened. Any zebra mussels on the surface to be treated or controlled are thus destroyed or killed by the heated water and may, if desired, be wiped or brushed from the treated surface.

Figure 1:
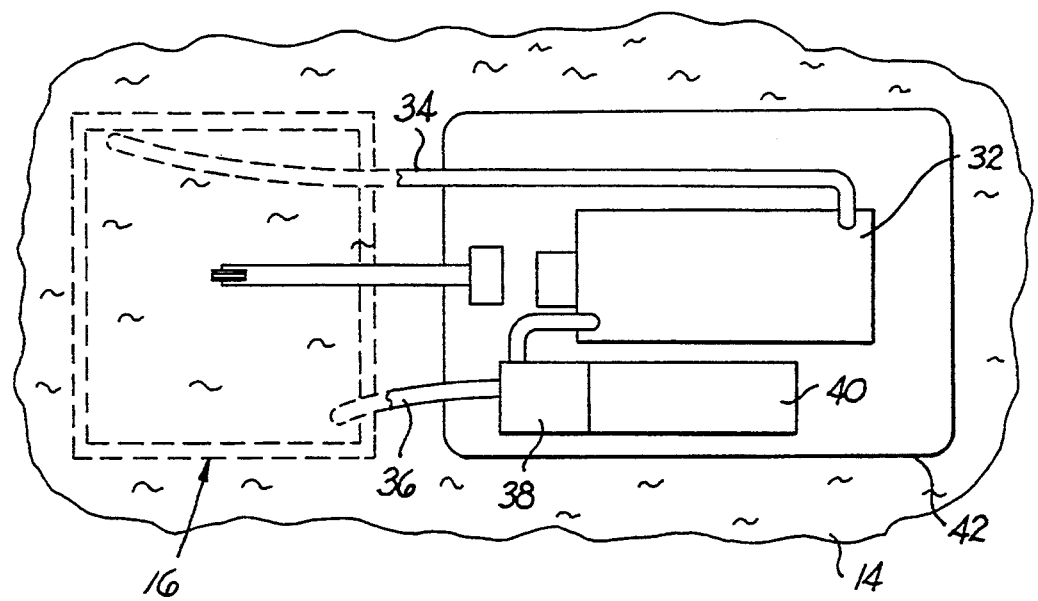
FIG. 1 is a top plan view in diagrammatic form depicting apparatus for performing the method of controlling zebra mussels on the bottom surface of a waterway in accordance with the principles of the present invention.
Figure 2:
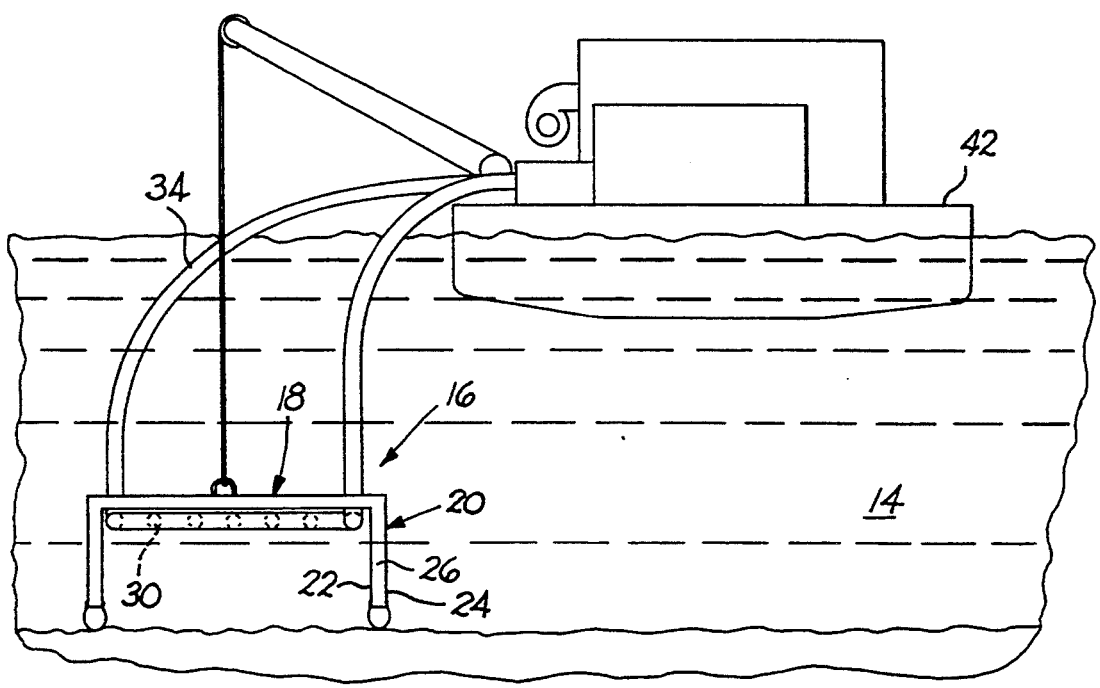
FIG. 2 is a diagrammatic side elevational view of the apparatus of FIG. 1 with portions thereof in sections.

As illustrated in FIGS. 1 and 2 with regard to the treatment of a bottom surface 12 of a waterway 14 such as a lake, stream or river, there is provided a chamber 16 comprising a housing enclosed about all but the bottom so as to provide an open bottom chamber. Thus, the chamber 16 has an upper wall 18 with a depending skirt 20 defining the sides, the wall 18 and skirt preferably being formed with inner and outer skins or surfaces 22, 24 formed from non-corrosive material such as stainless steel, and has insulation 26 mounted between the skins 22, 24. Positioned about the bottom end of the skirt 20 may be a flexible boot forming the base of the chamber and which permits the chamber to conform to irregular contours of the bottom surface so that the chamber may be enclosed about the surface 12 to be treated with a batch of water within the chamber. Rollers (not illustrated) may also be disposed at the bottom of the skirts adjacent to the boot for chambers having a substantially rectangular configuration so as to roll from one position to another. Alternatively, skids (not illustrated) may be provided for this same purpose.

Mounted within the chamber adjacent the upper wall 18 is an array of coils 30 defining a heat exchanger through which is circulated a heat medium in the form of a hot fluid. The fluid is heated by a heater 32 which may be a direct firing heater such as the heater described in U.S. Pat. No. 4,357,910 assigned to the common asignee of the present application. The heated fluid is fed from the heater 32 to the heat exchanger 30 through a supply conduit 34, circulates through the heat exchanger and returns through a return conduit 36 to the heater. A pump 38 acts to circulate the heated fluid medium through the system which may include an expansion tank 40. Thus, the heat from the fluid medium is transferred to the batch of water isolated within the chamber 16 to heat the water. The heater 32 is fired to raise the temperature of the water within the chamber 16 to approximately 95° F. to 100° F. and the water is held at that temperature for about at least 30 minutes to ensure a 100 percent mortality to the zebra mussels in the water. Thus, any zebra mussels on the surface 12 within the chamber are killed and the chamber may then be removed to another location to repeat the process.

The heater, pump, expansion tank and associated plumbing, including the fuel such as gas, oil or coal, together with a compressor which may be required to supply air for combustion of the fuel, defines the heating plant, and this heating plant may be located on a mobile facility on land adjacent to the surface to be treated, or preferably, as illustrated, on a barge 42 which may be moved readily from one treating location to another.

Thus, the water about the surface 12 is isolated along with the surface, heated to a lethal temperature for zebra mussels, held at that temperature for a sufficient time to kill the zebra mussels, and then the surface and the batch of water within the chamber is released from the isolated state. The zebra mussels on the surface are thus destroyed and cannot thereafter reproduce.

Figure 3:
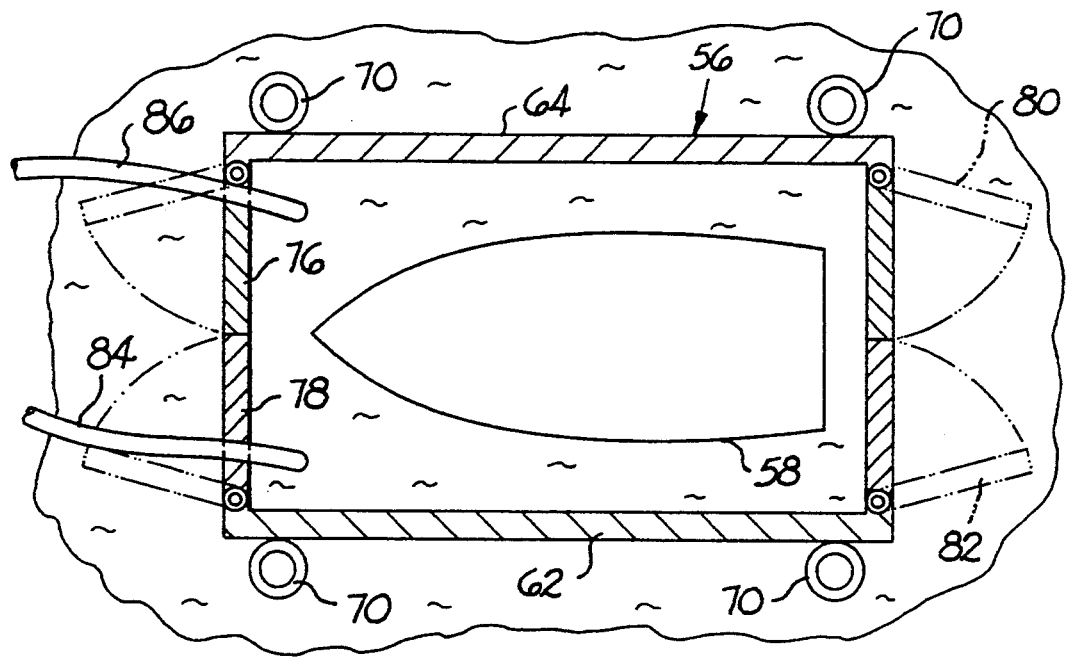
FIG. 3 is a diagrammatic top plan view of apparatus for performing the method of controlling zebra mussels on the hull of a watercraft according to the present invention.
Figure 4:
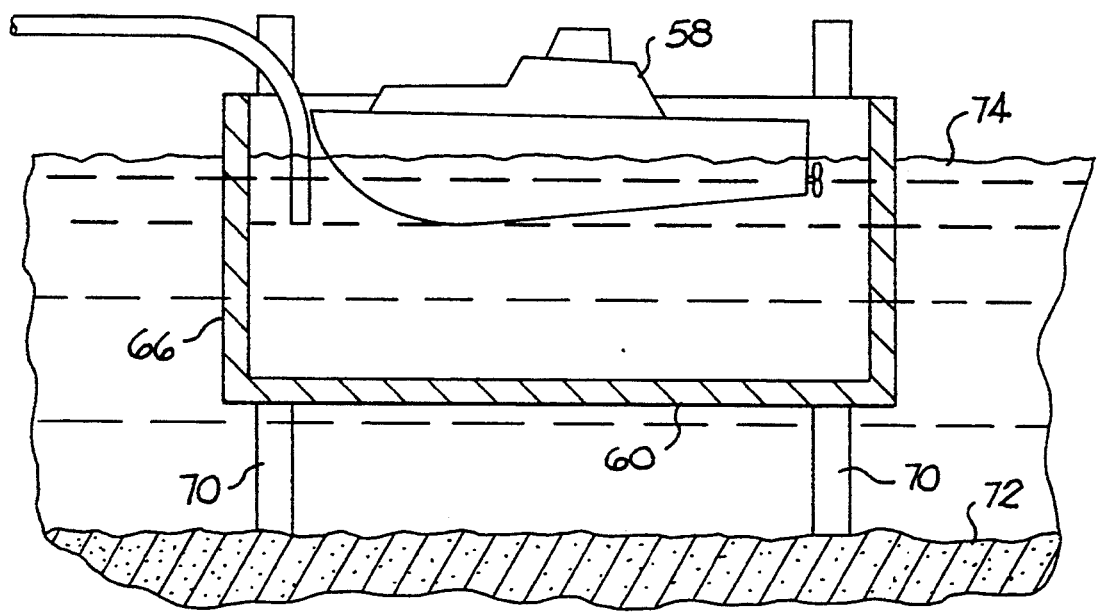
FIG. 4 is a diagrammatic side elevational view partly in section of the apparatus depicted in FIG. 3.

Another aspect of the present invention is the treatment of the hull of a watercraft or vessel. As illustrated in FIGS. 3 and 4, a tank or chamber 56 large enough for receipt of a vessel 58 is provided, the chamber having a bottom or base 60, a pair of sides 62, 64 and a pair of ends 66, 68. The sides of the chamber are secured to posts, pilings or the like 70 which support the chamber above the bottom surface 72 of a waterway 74. The ends 66, 68 of the chamber may comprise a pair of respective gates 76, 78 and 80, 82 which are hinged so as to open and close selectively, the gates being similar, but smaller, to the gates at the locks of a dam. Of course, only a set of gates at the entry end may be necessary so that a vessel may enter and leave through the same set of gates. Heated water may be supplied from a heat plant as heretofore described, located on land adjacent the chamber, or on a barge or the like through a supply conduit 84, and water within the chamber is returned to the heating plant through a return conduit 86. Alternatively, there may be heat exchanger coils similar to that illustrated in FIG. 2 in conjunction with the treatment of the waterway bottom surface, disposed adjacent the base 60, the heat exchanger being supplied with a heated fluid medium to heat the water within the chamber 56.

Thus, the gates 80, 82 may be opened to permit entry of a vessel 58 into the chamber 56, the gates 76, 78 being open or closed at that time. Thereafter all the gates are closed so as to isolate the batch of water and the vessel within the chamber. The water within the chamber is then heated as aforesaid either by communicating the water through the conduits 84, 86 to be heated outside the chamber or by a heat exchanger within the chamber heated by a fluid heat transfer medium circulated through the heating plant outside the chamber. After the water within the chamber is heated to approximately 95° F. to 100° F. and held at that temperature for about 30 minutes or more, to kill the zebra mussels in the water within the chamber, and thus the zebra mussels on the surface of the hull of the vessel contacting the water, the gates 76, 78 are opened to permit the vessel to exit the chamber. Alternatively, as aforesaid, the gates 80, 82 may be opened and the vessel backed out. If desired a flexible brush (not illustrated) may be mounted within the chamber 56 to wipe off dead zebra mussels from the hull, and the vessel may pass over and contact the brush, or the hull may be manually cleaned while within the chamber or after exiting the chamber. Thus, vessels may be brought to a cleaning facility having a chamber as aforesaid so that zebra mussels on the hull may be destroyed and removed.

Figure 5:
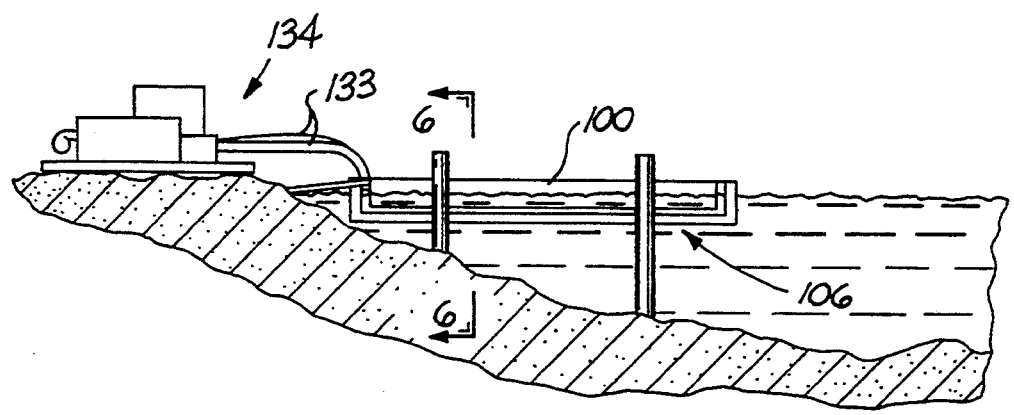
FIG. 5 is a diagrammatic side elevational view of apparatus for controlling zebra mussels on a portion of a dock according to the method of the present invention.
Figure 6:
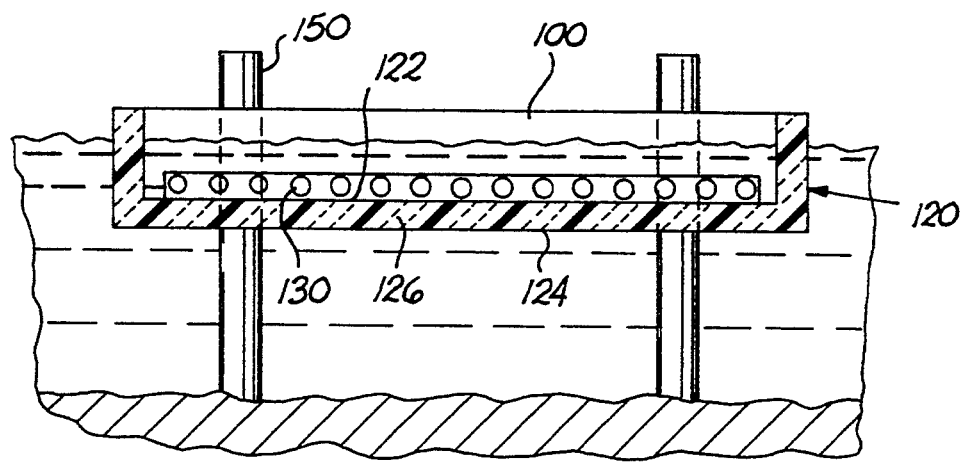
FIG. 6 is a cross sectional view taken substantially along line 6—6 of FIG. 5 of a portion of the apparatus depicted in FIG. 5.
Figure 7:
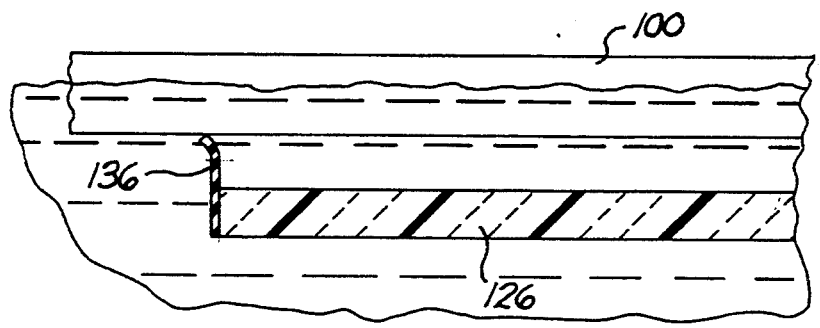
FIG. 7 is a cross sectional view taken substantially along line 7—7 of FIG. 6.

In another aspect of the present invention, as illustrated in FIGS. 5 and 6, a dock 100 or slip at a marina or the like may be treated to kill zebra mussels which have attached thereto. The portion of the dock to be treated and the water about the dock portion to be treated may be isolated by a chamber 106 constructed in sections by assemblies which may be assembled about the portion of the dock to be treated. The chamber 106 may be constructed in a manner similar to the chamber 16, i.e., with walls 120 having corrosion resistant metal skins 122, 124 forming a jacket with insulation 126 therebetween, and having heat exchanger coils 130 disposed about the upper surface of the bottom wall 132. The heat exchanger may be supplied with a heated fluid medium circulated through conduits 133 from a heat plant 134 located on land adjacent the dock, the heating plant being mobile for use at various locations or, of course, the heating plant may be mounted on a barge or the like as illustrated in conjunction with the waterway treating apparatus depicted in FIGS. 1 and 2. Additionally, as illustrated in FIG. 7, in regard to docks of extended length, the chamber may include flexible seals 136 secured at the ends of the chamber which contact portions of the dock adjacent to the portions to be treated, e.g., where the dock extends extensively into the waterway or onto the adjacent land surfaces of the marina or the like so that the chamber 106 isolates the portions of the dock to be treated together with the water which contacts those portion of the dock from the remainder of the marina.

If desired, as illustrated in FIG. 8, the space between the metal jacket walls skins or surfaces 122, 124 may include an air chamber 138 which is pneumatically sealed. The chamber 106 may then be positioned about the dock at the underside and compressed air may then be pumped through a conduit 140 into the air chamber to raise the dock isolating chamber 106 until it is positioned about the underside of the dock to isolate the dock portion to be treated. After treatment of the dock, water may be fed through conduits 142 into the air passage to lower the chamber from its raised position for disassembly. To treat the dock and kill zebra mussels attached to the isolated surfaces thereof, heated fluid medium is supplied by the heat plant 134 through the conduits 133 to the heat exchanger 130 to heat the batch of water isolated within the chamber 106 to a temperature approximately 95° F. to 100° F. This temperature is maintained for about at least 30 minutes to kill the zebra mussels in the batch of water within the chamber and thus the contacting surfaces of the dock.

The pilings or posts 150 which support the dock may be treated as illustrated in FIGS. 9 and 10 by enclosing the pilings within a chamber 156 formed from a pair of half sleeves 158, 160 clamped together by clamps, bolts or other connecting means 162 through flanges 164, 166 formed on the half sleeves to thereby position the chamber 156 about the pilings 150 spaced slightly therefrom so that water is disposed within the chamber about the pilings. The top and bottom of the sleeves includes seals 168, 170, the top seal 168 including conduits 172, 174 extending therethrough which communicate with the space within the chamber 156. Water heated by a heat exchanger at the heat plant is then communicated with the batch of water about the pilings which is returned to the heat plant to be heated. Thus, the water within the chamber 156 about the pilings are heated to the zebra mussel killing temperatures of 95° F. to 100° F. which is continued for about 30 minutes to kill all the zebra mussels contacting the piling.

Accordingly, the present invention provides a method of killing zebra mussels which attach to a surface in water by isolating the surface in a batch of water, heating the isolated batch of water to a temperature which is lethal to the zebra mussels, maintaining the batch of isolated water at the lethal temperature for a sufficient time to kill the zebra mussels in the isolated water, and thus the zebra mussels attached to the surface, and thereafter releasing the treated water and surface from the isolated state.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of destroying zebra mussels attached to a surface disposed in water, comprising:
    (a) isolating said surface and a batch of water in contact with said surface within a chamber separating said batch of water from water outside said chamber;
    (b) heating said batch of water to raise the temperature of said batch of water to a temperature lethal to said zebra mussels;
    (c) maintaining said batch of water at said lethal temperature for a period of time sufficient to kill said zebra mussels; and
    (d) thereafter releasing said batch of water and said surface from said chamber.

2. In the method as recited in claim 1, wherein said batch of water is heated to raise the temperature of the water within said chamber to a temperature range of approximately 95° F. to 100° F.

3. In the method as recited in claim 2, wherein said batch of water is maintained for approximately 30 minutes in said temperature range.

4. In the method as recited in claim 1, wherein said heating of said batch of water occurs while said batch of water is maintained isolated within said chamber.

5. In the method as recited in claim 1, wherein said heating of said batch of water comprises feeding water from said chamber to a location outside said chamber, heating said water at said location, and returning said water to said chamber.

6. In the method as recited in claim 1, wherein said isolating of said surface and said batch within said chamber comprises disposing a chamber having depending skirts over a bottom surface of a waterway, and moving said chamber until end portions of said skirt abut against said surface.

7. In the method as recited in claim 6, wherein said heating of said batch of water occurs while said batch of water is maintained isolated within said chamber.

8. In the method as recited in claim 1, wherein said isolating of said surface and said batch within said chamber comprises disposing a watercraft having a hull within water in said chamber, and closing said chamber against substantial ingress and egress of water so as to isolate and form said batch of water within said chamber, and said surface is defined by water contacting said hull.

9. In the method as recited in claim 8, wherein said heating of said batch of water comprises feeding water from said chamber to a location outside said chamber, heating said water at said location, and returning said water to said chamber.

10. In the method as recited in claim 1, wherein said isolating of said surface and said batch comprises disposing said chamber about water contacting surface portions of a dock, and sealing said chamber against escape of water.

* * * * *